Patented July 7, 1931

1,813,636

UNITED STATES PATENT OFFICE

IRNFRIED PETERSEN, OF WOLFEN, NEAR BITTERFELD, AND CURT ENGELBRECHT, OF DESSAU, IN ANHALT, GERMANY, ASSIGNORS TO I. G. FARBENINDUSTRIE AKTIEN-GESELLCHAFT, OF FRANKFORT-ON-THE-MAIN, GERMANY, A CORPORATION OF GERMANY

PROCESS OF SEPARATING FORMIC ACID FROM ACETIC ACID

No Drawing. Application filed February 1, 1929, Serial No. 336,910, and in Germany February 7, 1928.

The present invention relates to a process of separating formic acid and acetic acid from a mixture by distillation.

It is known that alcohols, fatty acids and their esters may be separated from water with the aid of an added liquid.

According to this invention a mixture of formic acid and acetic acid which cannot be separated into its constituents by distillation, can be so separated when there is added a liquid which mixes well with acetic acid, but not at all, or to only a small extent, with formic acid and forms with the latter an azeotropic mixture. As such a liquid may be used an organic compound, for instance, a hydrocarbon or a halogen derivative of a hydrocarbon, for example benzene, trichlorethylene or carbon tetrachloride.

The following examples illustrate the invention:—

Example 1.—A mixture of formic acid and acetic acid, consisting of 150 parts of formic acid of 96 per cent. strength and 300 parts of acetic acid of 98 per cent. strength, is distilled together with trichlorethylene in a vessel fitted with a condenser. The mixture of formic acid and trichlorethylene distils at 75-80° C. and separates into layers in the receiver; the trichlorethylene which constitutes the lower layer is returned to the vessel containing the mixture of acids. On this account the quantity of the added trichlorethylene is not essential to perform the separation. It may be varied within wide limits and may amount, for instance, to the quantity of the mixed acids. When the formic acid has distilled the temperature rises somewhat and the remaining trichlorethylene distils. When this latter distillation is at an end (about 83° C.) the residue consists of acetic acid. The formic acid on the one hand and the acetic acid on the other, can be easily purified, for instance by repeated distillation. The trichlorethylene can always be used again.

Example 2.—A mixture of 150 parts of formic acid of 100 per cent strength and 300 parts of acetic acid of 100 per cent strength is distilled together as described in Example 1 with 550 parts of carbon tetrachloride. Carbon tetrachloride and formic acid distil between 68 and 72° C. The distillate is a uniform liquid, anhydrous formic acid being soluble in carbon tetrachloride. A little addition of water is sufficient to separate the said compounds.

Example 3.—A mixture of 150 parts of formic acid of 96 per cent strength and 300 parts of acetic acid of 98 per cent strength on addition of 450 parts of benzene is distilled as described in Example 1. The azeotropic mixture of formic acid and benzene distils between 71 and 74° C. and separates in the receiver into two layers. The formic acid is removed and the benzene is allowed continuously to return to the vessel. Finally rests a solution of acetic acid in benzene, from which the constituents may be separated by distillation as usual.

Example 4.—A mixture of 50 parts of formic acid of 99 per cent strength and 100 parts of acetic acid of 98 per cent strength on addition of 150 parts of benzine is distilled as described in Example 1. The azeotropic mixture of formic acid and benzine distils between 83 and 86° C. The formic acid and acetic acid obtained may be purified by repeated distillation.

Example 5.—A mixture of 50 parts of formic acid of 96 per cent strength, 100 parts of acetic acid of about 98 per cent and 50 parts of water is distilled according to Example 1 on addition of 150 parts of trichlorethylene. At 76-77° C. a mixture of water and formic acid distils, at the end in the vessel remains a solution of acetic acid in trichlorethylene. The diluted formic acid may be concentrated in known manner.

We claim:—

1. In the process of separating formic acid from acetic acid, the steps which comprise adding to the mixture of said acids an organic liquid being a solvent for acetic acid, but a non-solvent for formic acid being capable of forming an azeotropic mixture with formic acid, and distilling the formic acid together with the organic liquid.

2. In the process of separating formic acid from acetic acid, the steps which comprise adding to the mixture of said acids an organic liquid of the group consisting of hydrocarbons and halogenated hydrocarbons, and distilling the formic acid together with the organic liquid.

3. In the process of separating formic acid from acetic acid, the steps which comprise adding to the mixture of said acids an organic liquid of the group consisting of benzene, benzine, trichlorethylene, carbon tetrachloride, and distilling the formic acid together with the said organic liquid.

4. In the process of separating formic acid from acetic acid, the steps which comprise adding to the mixture of said acids trichlorethylene, and distilling the formic acid together with trichlorethylene.

In testimony whereof, we affix our signatures.

IRNFRIED PETERSEN.
CURT ENGELBRECHT.